Oct. 18, 1932.  T. N. PIERSON  1,882,875
GRAIN DIVIDER EXTENSION
Filed July 8, 1929  2 Sheets-Sheet 1

INVENTOR
Torvald N. Pierson
BY Arthur E. Brown
ATTORNEY

Oct. 18, 1932.   T. N. PIERSON   1,882,875
GRAIN DIVIDER EXTENSION
Filed July 8, 1929   2 Sheets-Sheet 2
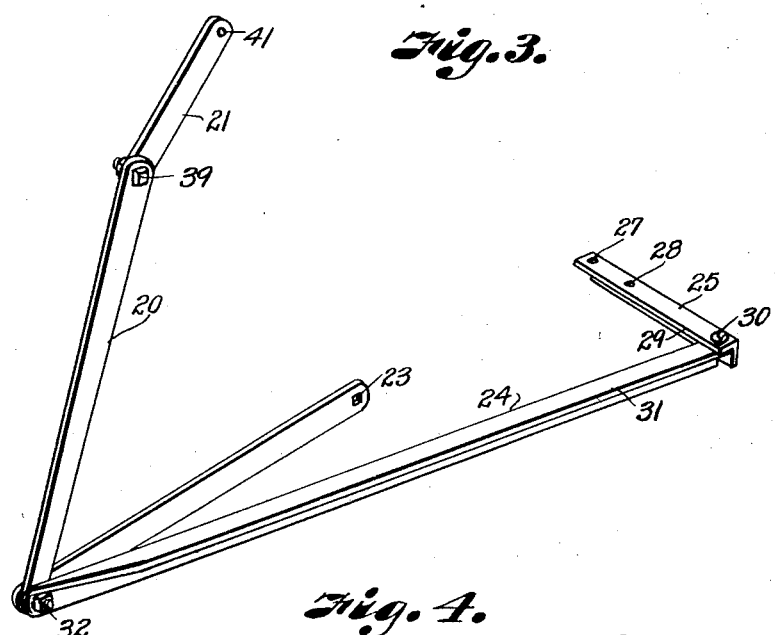
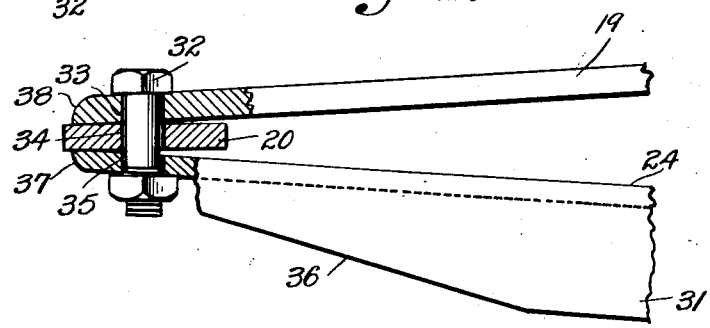
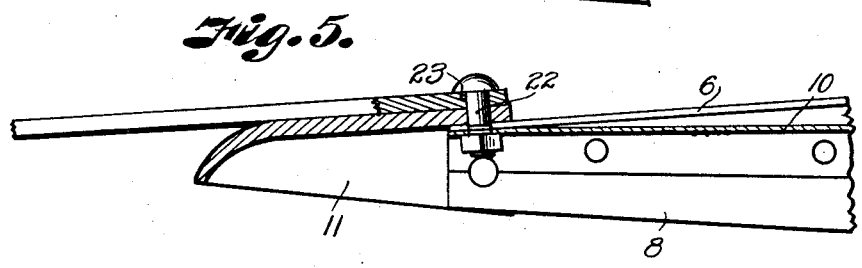
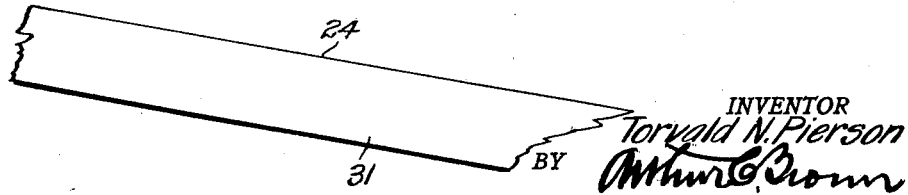
INVENTOR
Torvald N. Pierson
BY Arthur C. Brown
ATTORNEY Patented Oct. 18, 1932

1,882,875

UNITED STATES PATENT OFFICE

TORVALD N. PIERSON, OF INDEPENDENCE, MISSOURI, ASSIGNOR TO THE GLEANER COMBINE HARVESTER CORPORATION, OF INDEPENDENCE, MISSOURI, A CORPORATION OF DELAWARE

GRAIN DIVIDER EXTENSION

Application filed July 8, 1929. Serial No. 376,709.

This invention relates to grain dividers for harvesting machines, and more particularly to a divider extension for separating matted and entangled crops.

In harvesting entangled grain with a combine or other harvesting machines, the grain at the outer end of the sickle bar is cut before the ordinary divider has opportunity of separating the grain in the swath from the standing grain. Consequently the cut grain gathers on the divider and interferes with its functioning, or the cut grain, being entangled with the standing grain, is jerked out of the path of the harvester reel so that the harvester fails to remove all of the grain cut from the swath.

It is, therefore, the purpose of this invention to provide for separation of the grain in the swath from the standing grain so that the grain adjacent the outer end of the cutter bar will not bunch on the divider to clog the machine, and to assure that the grain in the swath is entirely separated from the grain left standing before it is cut by the sickle.

In accomplishing these and other objects of the invention, I have provided improved details of structure, the preferred form of which is shown in the accompanying drawings, wherein:

Fig. 3 is a detail perspective view of the divider extension removed from the grain divider.

Fig. 4 is a plan view of the nose portion of the divider extension, part of which is shown in section to illustrate the connection of the extension members.

Fig. 5 is a horizontal sectional view through the nose portion of the grain divider, illustrating attachment of the divider extension bar.

Figure 1:
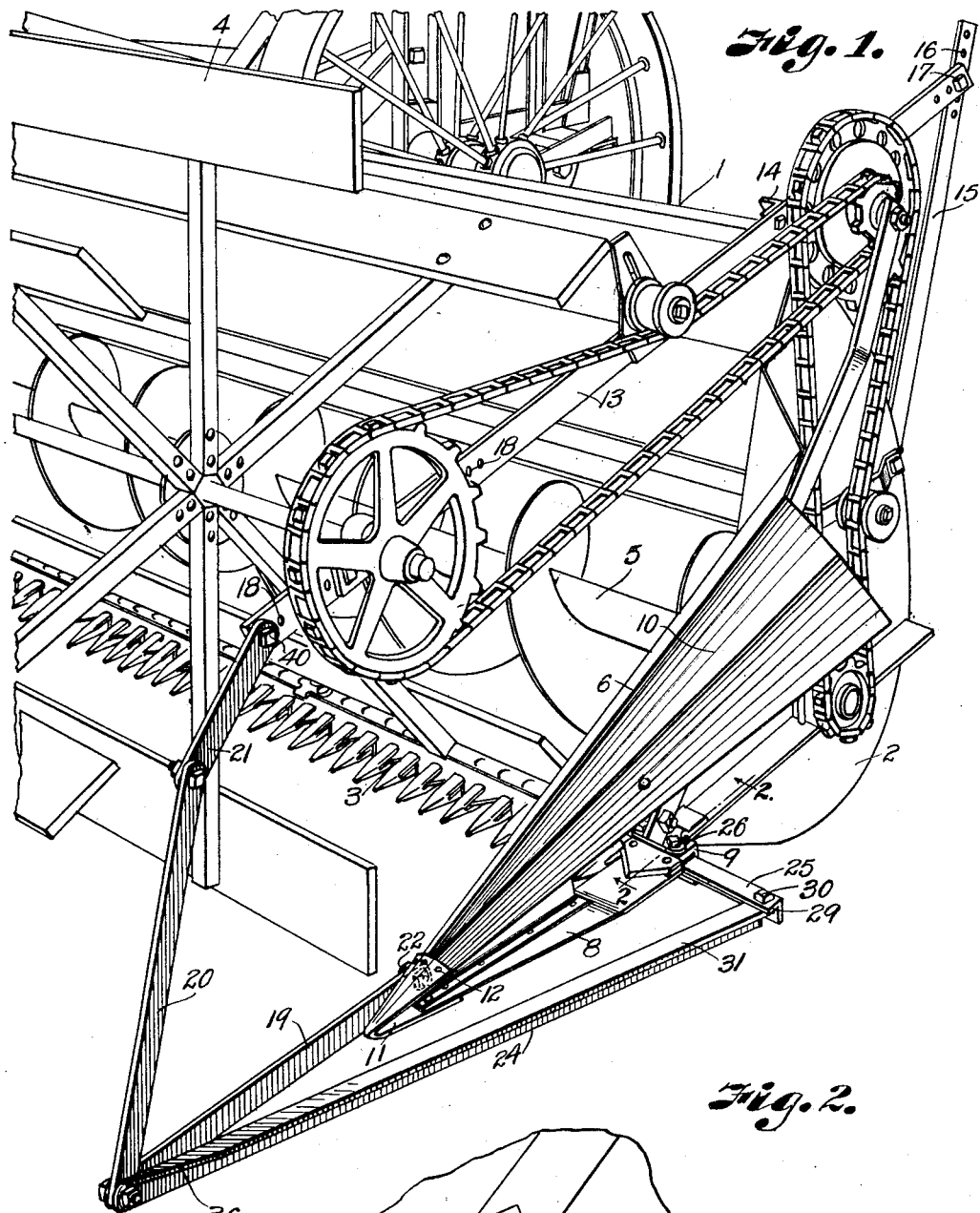
Fig. 1 is a perspective view of a portion of an ordinary grain harvesting machine, illustrating the divider equipped with an extension constructed in accordance with my invention.

Referring more in detail to the drawings:

1 designates a harvesting mechanism of conventional type including a grain pan 2, a sickle 3 attached to the forward edge of the grain pan, a reel 4 for bringing the grain into engagement with the sickle, and a conveyor 5 for discharging cut grain into the separating mechanism in the usual manner.

6 designates a conventional type of grain divider which, in the present instance, includes a plate 8 attached to and extending forwardly from the sickle supporting bar 9, and riveted to the plate 8 and to the end of the grain pan is a substantially inclined pyramidal-shaped divider board 10 having its apex extending forwardly of the sickle bar and equipped with a shoe 11 which is attached to the divider board and to the plate 8 by rivets 12 extending through the shoe and the divider board.

The divider thus far described is of conventional type and specifically forms no part of this invention as my improved divider extension may be used with any standard type of grain divider.

In the machine illustrated the grain reel 4 is rotatably supported on arms 13 pivotally mounted on posts 14 extending upwardly from the grain pan structure. The rear ends of the arms 13 extend rearwardly of the grain pan and are attached to a link 15 supported at its lower end from the grain pan and provided at its upper end with a series of apertures 16 for receiving the bolt 17 which attaches the arm to the link 15. The forward end of the arm may be vertically adjusted to position the heighth of the reel with relation to the sickle bar by location of the bolt 17 in any one of the holes 16.

The forward ends of the arms are also provided with series of apertures 18 so that the reel bearings may be shifted longitudinally of the arms to position the reel in suitable spaced relation with the sickle according to the type of material being harvested.

With a harvesting machine constructed as thus far described, the divider 6 separates the grain in the swath from the standing grain and is designed particularly for separating grain under favorable conditions, that is, where the grain is standing upright and where it has not become entangled. However, when entangled grain, and particularly vine crops, are being cut, the divider is not of sufficient length or heighth to properly separate the cut material, and such material remaining entangled with the standing material is collected on the divider and clogs the space between the reel and the divider board. When a sufficient amount of material has been gathered on the divider, the reel, instead of discharging into the grain pan, generally pushes the material off of the divider onto the standing grain and, in vine crops, the vines which are attached to those not cut are drawn from the divider and do not enter the grain pan.

As heretofore mentioned, it is the purpose of my invention to provide for separating the entangled crop before it is cut by the sickle bar, and in accomplishing this object I have provided an extension which projects forwardly from the divider and engages the grain substantially in advance of the sickle, to stretch the grain forwardly of the sickle bar and loosen entangled ends from the grain outside of the swath before the cutting takes place. Consequently all of the grain when cut is entirely free from the standing vines so they can be fed into the conveyor 5 without bunching up on the divider board.

Figure 2:
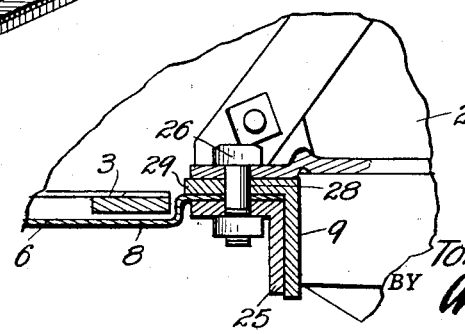
Fig. 2 is a vertical sectional view through the sickle supporting angle bar, and a portion of the divider on the line 2—2, Fig. 1, and particularly illustrating the attachment of the extension brace support.

The preferred embodiment of my invention includes a bar 19 pivotally attached to the toe portion of the divider 6 and which extends forwardly of the divider, the forward end of the bar being supported from the outer arm 13 by links 20 and 21 suspended from the forward end of the arm 13, and the bar 19 being secured to the shoe 11 by a bolt 22 which extends through an opening 23 in the end of the bar and through one of the rivet openings at the inner side of the shoe, as best shown in Fig. 5. The forward end of the bar 19 is braced laterally by an angle bar 24 which is supported at its rear end by an angle bar section 25, bolted to the angle 9 by bolts 26 that project through openings 27 and 28 in the angle bar section, as best shown in Fig. 2.

The angle section 25 is preferably nested within the angle 9 and projects from the end thereof a sufficient distance to support the brace member 24 at an angle to the bar 19, the brace member 24 being preferably connected with the horizontal flange 29 of the angle 25 by a bolt 30 which projects through an opening in the flange 29 and an opening in the horizontal flange 31 of the brace 24 and the forward end of the angle brace secured to the extension bar 19 and to the lower end of the link 20 by a bolt 32 extended through openings 33, 34 and 35 in the respective members, as shown in Fig. 4.

The horizontal flange 31 of the brace member is preferably clipped at an angle as at 36 to provide unobstructed passage of the brace member through the material to be cut and the vertical flange of the brace, and the extension members are preferably rounded as at 37 and 38, respectively.

The links 20 and 21 are preferably connected by a bolt 39 and the upper free end of the link 21 is connected to the arm 13 by a bolt 40 which extends through an opening 41 in the end of the link and through one of the openings 18 in the arm. Thus the forward end of the extension member 19 and extension brace 24 are suspended from the arm 13 and may be elevated or lowered, to suit different conditions, by loosening the bolts 32, 39 and 40 and moving the pivotal connection of the links forwardly, to raise the extension bar, or rearwardly, to lower the extension bar towards the ground. After a suitable adjustment has been made, the extension bar may be retained in adjusted position by retightening the bolts 32, 39 and 40.

In assembling the divider extension constructed as described, the bolts 26 are removed and inserted through the openings 27 and 28 in the brace support 25 which is inserted within the angle of the member 9. The rivet 12 in the side of the shoe 11 is then removed and the extension bar is secured to the shoe by inserting the bolt 22 through the opening 23 in the end of the bar and through the opening from which the rivet was removed. The links 21 and 20 are then suspended from the end of the arm 13 by inserting the bolt 40.

The hinge connection between the links is then moved in an arc from the bolt 40 to position the elevation of the bar extension 19 for the particular material being cut, whereupon the bolts 39, 40 and 32 are tightened to bind the parts together and retain them in adjusted position. Then as the harvester is moved through the field the link 20 will engage the fallen grain or vines and continued forward movement of the machine will cause the vines to be stretched by the link 20 until their tops are freed from the grain at the outer side of the divider extension so that when the grain or vines are cut by the sickle the cut material may be readily fed into the conveyor 5 by the reel 4.

From the above description it is readily apparent that the divider extension may be readily assembled on the harvesting machine without altering the construction of the machine, and when so desired the divider extension may be readily removed and the machine operated with the regular grain divider.

What I claim and desire to secure by Letters Patent is:

1. In combination with a grain divider, an extension member projecting forwardly of the divider, means for supporting the extension member, and lateral bracing means connected with the forward end of the extension member and cooperating therewith to divide grain in advance of the divider.

2. In combination with harvesting mechanism including a grain divider and a reel support, an extension member comprising a bar attached to the grain divider, and adjustable means connecting the bar with the reel support.

3. In combination with harvesting mechanism including a grain divider and a reel support, an extension member comprising a bar attached to the grain divider, and pivoted links connecting the forward end of the bar with the reel support.

4. In combination with harvesting mechanism including a grain divider and a reel support, an extension comprising a bar attached to the grain divider, a link connecting the forward end of the bar with the reel support, and a lateral brace for the bar.

5. In combination with harvesting mechanism including a grain divider and a reel support, an extension comprising a bar attached to the grain divider, means for adjustably connecting the forward end of the extension with the reel support, and a lateral brace for the extension.

6. In combination with harvesting mechanism including a grain divider and a reel support, an extension member carried by the divider and the reel support.

7. In combination with harvesting mechanism including a divider, a reel support, and a sickle bar support, an extension comprising a bar pivotally mounted on the divider, links connecting the forward end of the bar with the reel support, and brace members connecting the sickle bar support with the extension bar.

8. A divider extension comprising a bar, and means for supporting the bar in advance of a grain divider, including links supporting the bar horizontally, and a brace member for supporting the bar laterally.

9. In combination with a reel support and a grain divider, a divider extension comprising a bar, means for attaching the bar to the grain divider, and link members for pivotally connecting the bar with the reel support.

10. In combination with a harvesting mechanism including a grain divider, a sickle, and a reel for moving grain into contact with the sickle, a divider extension, a supporting member extending in advance of the reel, and means connecting the divider extension with said supporting member in advance of the reel for separating grain in swath from grain out of swath whereby entangled grain is free when engaged by the reel.

11. In combination with a harvesting mechanism including a sickle, a reel for moving grain in contact with the sickle, a grain divider including a pivoted bar projecting in advance of the reel, a supporting member extending in advance of the reel, and an inclined member at the end of the bar and connected with said supporting member for separating grain in swath from entanglement of grain out of swath whereby the grain in swath is free when engaged by the reel.

12. In combination with a harvesting mechanism including a grain pan, a sickle supported by the grain pan, a reel for moving grain into contact with the sickle, a support for the reel, a bar having its rear end supported from the grain pan and extending in advance of the reel, a brace member for bracing the forward end of the bar from the grain pan, and links connecting the forward end of the bar with the reel support and effecting separation of grain in swath cut by the sickle from entanglement with the grain out of swath before the grain is engaged by the reel.

13. In combination with a harvesting mechanism including a grain pan and a grain divider supported by said pan, an extension member attached to the grain divider, a vertically adjustable supporting member carried by the pan and projecting longitudinally above the extension member, and adjustable means connecting the extension member with said supporting member for separating grain in swath from grain out of swath.

14. In combination with a harvesting mechanism including a grain pan and a grain divider supported by said pan, an extension member attached to the grain divider, a vertically adjustable supporting member carried by the pan and projecting longitudinally above the extension member, and pivotally connected links for connecting the extension member with said supporting member for separating grain in swath from grain out of swath.

In testimony whereof I affix my signature.

TORVALD N. PIERSON.